United States Patent
Grgac et al.

(10) Patent No.: US 10,286,609 B2
(45) Date of Patent: May 14, 2019

(54) RESISTIVE IMPLANT WELDING CARBON FIBER COMPOSITE THERMOPLASTICS

(71) Applicant: Magna Exteriors Inc., Concord (CA)

(72) Inventors: Steven S. Grgac, Concord (CA); Ahmed Elagha, London (CA)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 15/737,390

(22) PCT Filed: Jun. 27, 2016

(86) PCT No.: PCT/IB2016/053834
§ 371 (c)(1),
(2) Date: Dec. 18, 2017

(87) PCT Pub. No.: WO2016/207872
PCT Pub. Date: Dec. 29, 2016

(65) Prior Publication Data
US 2018/0178457 A1    Jun. 28, 2018

Related U.S. Application Data

(60) Provisional application No. 62/185,296, filed on Jun. 26, 2015.

(51) Int. Cl.
*B23K 11/16* (2006.01)
*B29C 65/00* (2006.01)
(Continued)

(52) U.S. Cl.
CPC ............ *B29C 65/344* (2013.01); *B23K 11/16* (2013.01); *B29C 65/3468* (2013.01);
(Continued)

(58) Field of Classification Search
CPC . B29C 65/34; B29C 65/3404; B29C 65/3472; B29C 65/344; B29C 65/3476
(Continued)

(56) References Cited

U.S. PATENT DOCUMENTS

2003/0155066 A1    8/2003  Roehr
2004/0055699 A1*   3/2004  Smith ................... B29C 65/344
                                                          156/273.9
(Continued)

FOREIGN PATENT DOCUMENTS

CA    2707895 A1    6/2009
CA    2720289 A1    12/2009
(Continued)

OTHER PUBLICATIONS

International Search Report for International Application No. PCT/IB2016/053834, dated Sep. 14, 2016.
(Continued)

*Primary Examiner* — Carson Gross
(74) *Attorney, Agent, or Firm* — Warn Partners, P.C.

(57) ABSTRACT

A method of resistive implant welding thermoplastic composites. At least two sections of a component formed with weldable thermoplastic material are provided. The two sections of the component each have a welding surface along which the component is welded together. The welding surface includes a first surface adjoining a second surface at an angle exceeding about 30 degrees or another three dimensional shape. A first wire mesh conductor material is positioned between the welding surface of the at least two sections along the first surface. A second wire mesh conductor material is positioned between the welding surface of the at least two sections along the second surface in an overlapping manner at the angled connection. An electric current is applied to the conductors causing the conductors to heat up and melt the at least two sections of the component together.

20 Claims, 5 Drawing Sheets

(51) Int. Cl.
    *B29C 65/34*       (2006.01)
    *B29K 307/04*    (2006.01)

(52) U.S. Cl.
    CPC ...... *B29C 65/3476* (2013.01); *B29C 66/1312* (2013.01); *B29C 66/301* (2013.01); *B29C 66/54* (2013.01); *B29C 66/547* (2013.01); *B29C 66/7212* (2013.01); *B29C 66/73921* (2013.01); *B29K 2307/04* (2013.01); *B29K 2995/0005* (2013.01)

(58) Field of Classification Search
    USPC ...................................................... 156/273.9
    See application file for complete search history.

(56) References Cited

U.S. PATENT DOCUMENTS

| | | | |
|---|---|---|---|
| 2008/0152919 A1* | 6/2008 | Grgac | B29C 65/344 428/411.1 |
| 2011/0212331 A1* | 9/2011 | Dyke | B29C 65/342 428/414 |
| 2013/0307281 A1* | 11/2013 | Birka | B60R 19/03 293/120 |

FOREIGN PATENT DOCUMENTS

| | | |
|---|---|---|
| WO | 03059604 A1 | 7/2003 |
| WO | 2009088720 A1 | 7/2009 |
| WO | 2011106085 A1 | 9/2011 |
| WO | 2012109541 A1 | 8/2012 |
| WO | 2015155669 A1 | 10/2015 |

OTHER PUBLICATIONS

"Current Leakage Prevention in Resistance Welding of Carbon Fibre Reinforced Thermoplastics." Dube, M., Hubert, P., Yousefpour, A., Denault, J., Jul. 19, 2007. Composites Science and Technology 68 (2008) 1579-1587.

International Search Report for International Application No. PCT/IB2015/052485, dated Jul. 8, 2015.

* cited by examiner

RESISTIVE IMPLANT WELDING CARBON FIBER COMPOSITE THERMOPLASTICS

CROSS-REFERENCE TO RELATED APPLICATIONS

This application is a National Stage of PCT International Patent Application No. PCT/IB2016/053834, filed Jun. 27, 2016, which claims the benefit of U.S. Provisional Application No. 62/185,296 filed Jun. 26, 2015. The disclosures of the above applications are incorporated herein by reference.

FIELD OF THE INVENTION

The present invention relates to a process for welding of thermoplastic composite parts together having complex three dimensional weld joints.

BACKGROUND OF THE INVENTION

Resistive implant welding carbon fiber filled thermoplastic composite components for automotive applications has created challenges due to the conductivity of the carbon fiber fillers. These problems have been addressed by using highly conductive mesh materials such as that set forth in the copending application entitled RESISTIVE IMPLANT WELDING CARBON FIBER THERMOPLASTICS USING HIGHLY CONDUCTIVE MESH U.S. Ser. No. 61/978,042 filed Apr. 10, 2014 now International Application number PCT/IB2015/052485 filed 6 Apr. 2015 published as WO2015155669 A1, which applications are incorporated herein by reference as part of the present invention.

Even though the art is advanced by the enhancements above, resistive implant welding becomes complex due to three dimensional shapes commonly used in automotive panel lift gates and front end modules and the like. When the angles of the surfaces get sharp and/or the surfaces themselves are complex, the mesh gets contorted to an extent that the functionality in resistive implant welding is reduced or causes failure.

Thus, there is a need in the art to provide a process using resistive implant welding for tight angles and other complex three dimensional surfaces.

SUMMARY OF THE INVENTION

A method of resistive implant welding thermoplastic composites. The composite part includes two sections which are to be welded together along a surface. In a preferred embodiment, at least one section of the two component part is formed with carbon fiber material. The two sections of the component each have a welding surface along which the component is welded together. The welding surface includes a first surface adjoining a second surface at an angle exceeding about 30 degrees or another three dimensional shape. A first wire mesh conductor material is positioned between the welding surfaces of at least two sections along the first surface. A second wire mesh conductor material is positioned between the welding surfaces of at least two sections along the second surface in an overlapping manner at the angled connection. An electric current is applied to the conductors causing the conductors to heat up and melt the at least two sections of the component together. When using conductive weldable materials such as carbon fiber, each leg of the overlaid mesh material is energized for welding along the angle individually to minimize any shorting or shunting of electricity through the material of the part.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
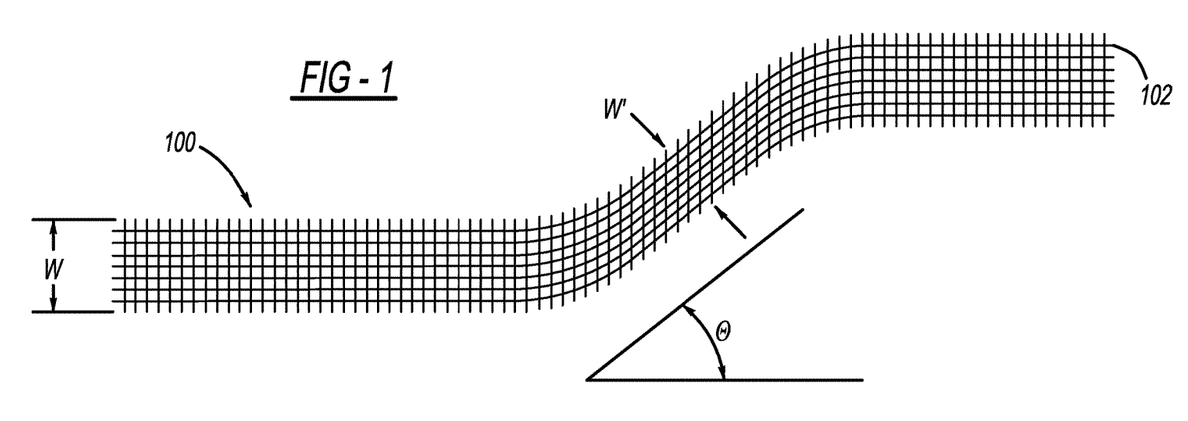
FIG. 1 is a view of the typical limitations of bending a wire mesh material for effective use in a normal resistive implant welding operation.

Referring to FIG. 1 generally, conventional methods of applying wire mesh, shown generally at 100, and bending wire mesh 100 around corners does not work, to an extent that the functionality in resistive implant welding is reduced or causes weld failure, because carrier wires 102 will contact one another. The parallelogram that the wire mesh 100 forms at large bend angles will close or otherwise significantly reduce the holes created by the mesh weave. This will not allow molten material to flow through the wire mesh once the mesh is sandwiched between two thermoplastic composites and a voltage is applied to opposite ends of the mesh. Currently, weld lines are limited to 45 degree bend angles to ensure the holes created by the mesh weave are still large enough to allow molten material to pass through the mesh weave. FIG. 1 illustrates the wire mesh width, indicated by "W", where the mesh weave openings or holes are generally square or otherwise suitable for accepting molten material for welding, and the angled area having an adjusted width, indicated by "W'", where the openings are parallelograms that generally will not allow molten material to effectively flow through the wire for welding.

For greater weld flexibility of three dimensional parts, conventional methods of resistive implant welding are limited by the amount that wire mesh can be bent in a plane. Usually this limit is 45 degrees using standard 0.009"

diameter wire woven to a mesh density of 16×16 wires per inch. The present invention resolves this bend limit using intersection points.

Referring to FIGS. 2-6 generally, a method of resistive implant welding thermoplastic composites is provided according to the present invention. A part assembly shown generally at 10 with at least a first part 12 and second part 14 that are weldable thermoplastic composite, preferably at least one formed of carbon fiber reinforced thermoplastic composite, are provided with a plurality of wire mesh strips indicated generally at 16 located along a plurality of surfaces of the first and second parts 12, 14 during welding. The wire mesh strips intersect. Intersection points are used as internal contact points for welding individual wire mesh strips as separate circuits. This allows current to be directed along more linear paths of the wire mesh without significant current loss throughout the part 10.

A part assembly shown generally at 10 with at least two sections, at least a first part 12 and second part 14, of a component formed with weldable thermoplastic material are provided. Preferably, at least one of the parts 12, 14 is formed of carbon fiber reinforced thermoplastic composite. The first and second parts 12, 14 of the component each have at least one welding surface along which the component is welded together. The welding surface includes a first surface adjoining a second surface at an angle exceeding about 30 degrees or another three dimensional shape. A first wire mesh conductor material is positioned between the welding surface of the at least two sections 12, 14 along the first surface. A second wire mesh conductor material is positioned between the welding surface of the at least two sections 12, 14 along the second surface in an overlapping manner at the angled connection. An electric current is applied to the conductors causing the conductors to heat up and melt the at least two sections of the component together.

Figure 3:
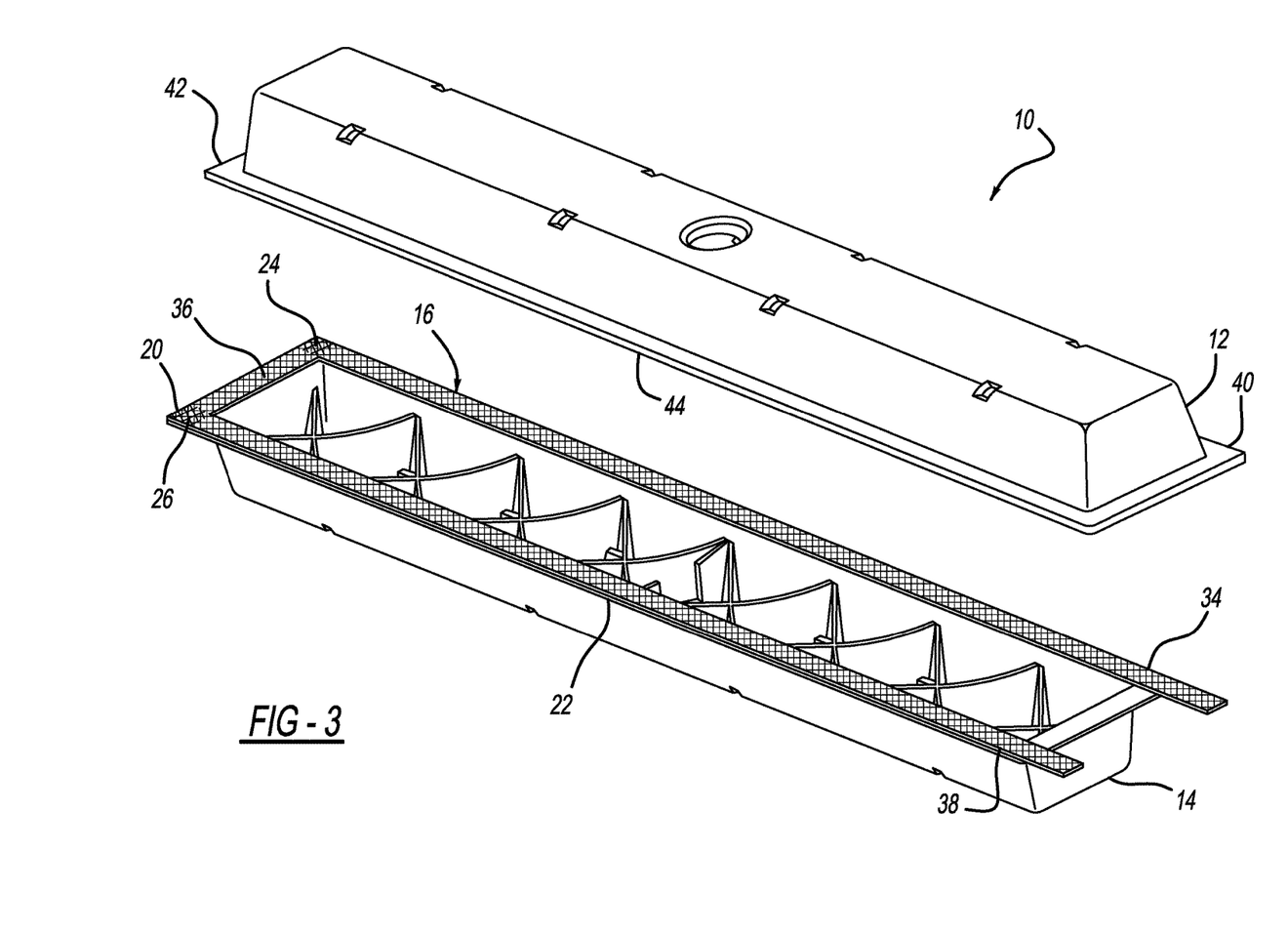
FIG. 3 is a perspective exploded view showing a 270 degree application of the process of the present invention.
Figure 6:
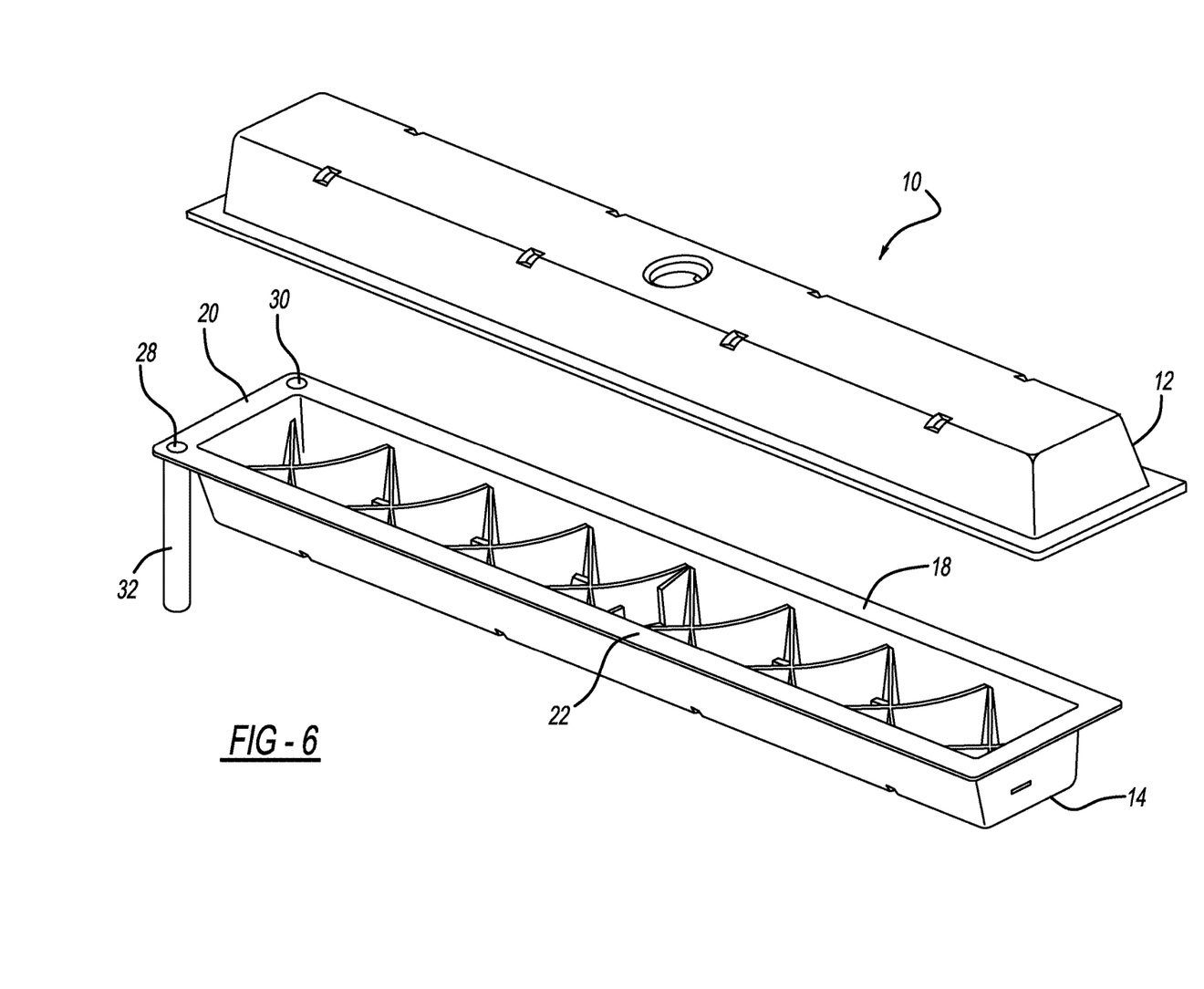
FIG. 6 is a perspective exploded view showing a part with two holes and a probe for contact with wire mesh; and, FIG. 7 is a top view showing current shunting across the part if only two end leads are used in a conductive material with a "standard" mesh material (such as stainless steel).

FIG. 3 depicts the first and second parts 12, 14 to be molded using a carbon fiber reinforced thermoplastic composite and three welding surfaces or "edges" that are required to be welded together (first surface 18, second surface 20, third surface 22 best shown in FIG. 6). The second surface 20 intersects with the first and third surface 18,22 at first and second intersection point points 24,26, respectively. All together the angles created by the weld lines is 270 degrees. As set forth previously, conventional methods of applying wire mesh and bending wire mesh around such corners is undesirable because the seven carrier wires will contact one another. See FIG. 1.

Figure 2:
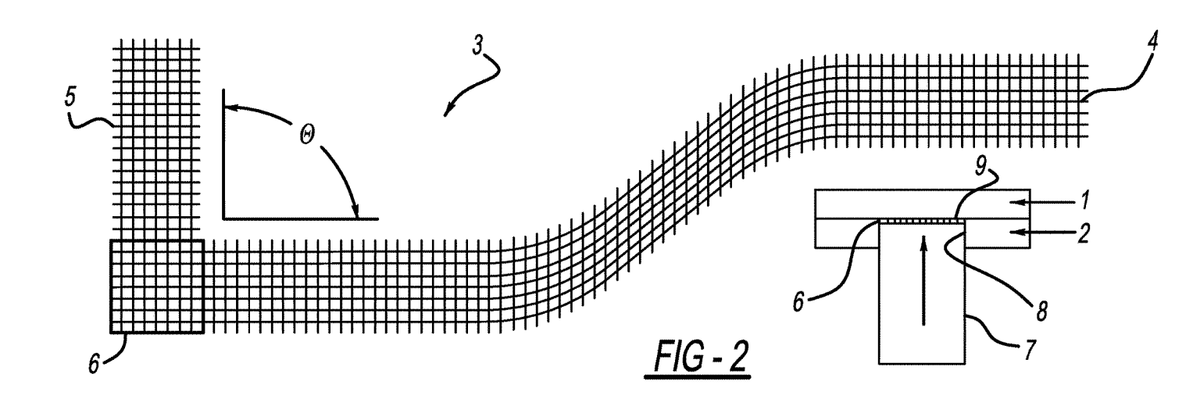
FIG. 2 is a top view and a sectional view showing the process for stacking the mesh material at a bend and showing contacting of the electrical probe.

To achieve desirable larger bend angles, such as shown in FIG. 3, the conventional method of applying one single strip of wire mesh into a planar angle of 270 degrees is not effective. FIG. 2 illustrates the method of achieving any bend angle desired. By applying a wire mesh conductor material 4, e.g., strip of wire mesh, along a part edge, with bend angles less than 45 degrees, and stacking a new strip of wire mesh 5 at a common intersection point 6, bend angles can be increased by any desired amount at the intersection point 6. Similarly, additional strips of wire mesh can be applied at other intersection points to further improve weld designability. To ensure good electrical contact of the stacked wire mesh at the intersection points 6, a probe 7 must pass through a hole 8 in one part shown generally at 2 and press against the stacked wire mesh 6 and the wall stock 9 of the second part shown generally at 1 (see FIG. 2).

At least one of the first or second parts 12, 14 of the part assembly 10 has at least one hole and at least on probe. FIG. 6 shows the second part 14 with two holes 28,30 and a probe 32 for contact with wire mesh 16, with the mesh 16 omitted for clarity. It is understood that more or less holes and probes are contemplated without departing from the scope of the present invention (e.g., an additional probe mirror image to probe 32 adjacent to hole 30). FIG. 5 shows the assembly 10 with wire mesh 16 stacked at intersection points 24, 26 to achieve the 270 degree weld joint angle. The first, second and third surfaces 18,22,22 shown in FIG. 3 can now be welded together as a single circuit as shown in FIG. 4.

In a preferred embodiment, a first strip of wire mesh 34 is applied to the first surface 18, and a third strip of wire mesh 38 is applied to a third surface 22. A second strip of wire mesh 36 is applied to the second surface 20 and intersects with the first and third strips 34,38 of wire mesh at intersection points 24,26. Alternatively, the second strip of wire mesh 36 is applied first, and the first and third strips 34,38 of wire mesh are applied to the first and third surfaces 18,22 and lay on top of the second strip of wire mesh 36 at intersection points 24,26. Alternatively, an additional wire mesh is applied at each intersection point 24,26. It is understood that more or less intersection points, pieces of wire mesh conductor material, and/or edges/surfaces to be welded are contemplated without departing from the scope of the present invention depending on the application.

Each of the first, second and third surfaces 18,20,22 on the second part 14 corresponds with a respective opposing fourth, fifth and sixth surfaces 40, 42,44 or "edges" on the first part 12, with the respective first, second and third strips of wire mesh 34,36,38 therebetween for welding.

Figure 4:
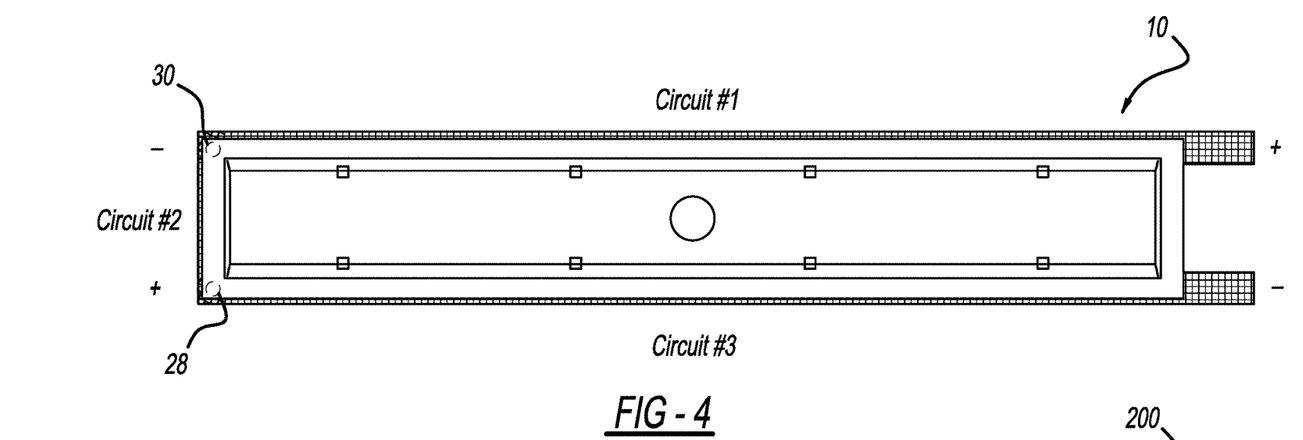
FIG. 4 is a top schematic view of the part of FIG. 3 showing the individual circuits used when resistive implant welding of a 270 degree angle connection in a single step with a non-conductive thermoplastic material.
Figure 5:
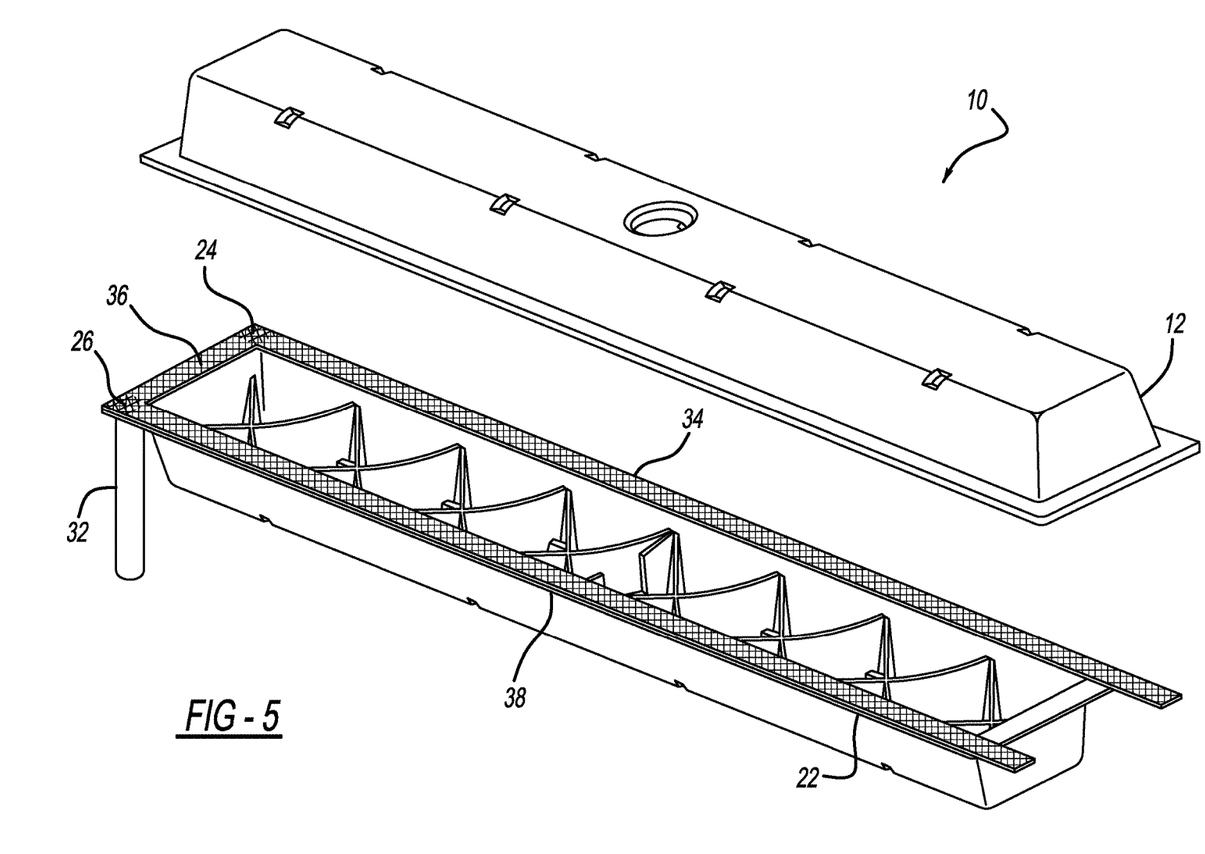
FIG. 5 is a perspective exploded view showing a part with wire mesh stacked at intersection points to achieve the 270 degree weld joint angle.

The method of processing the weld for conductive composites involves welding each strip of wire mesh (e.g., 34,36,38) separately as an individual circuit, as shown in FIG. 4. A first circuit, indicated as "Circuit #1", is welded using a unique set of processing parameters using the intersection point probe as a pole and the other adjacent circuit end as the opposite pole. Positive and negative changes are applied to Circuit #1 while the remaining poles are disconnected from the voltage source. After the necessary current required to weld Circuit #1 has been completed, the poles directly adjacent to a second circuit, indicated as "Circuit #2", are activated with opposite polarities while the remaining poles are disconnected from the voltage source. Circuit #2 is again energized with a unique set of processing parameters. The process is repeated for a third circuit, indicated as "Circuit #3".

Figure 7:
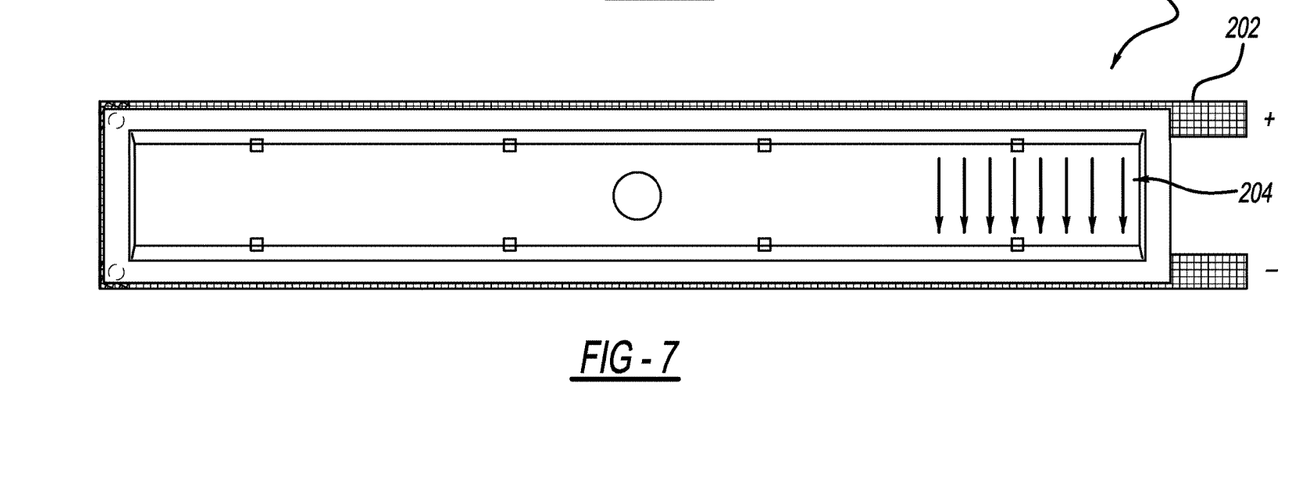

The above methods work well for non-conductive composites. For conductive composites, the method will not work unless the mesh material is much more conductive than the composite. Referring now to FIG. 7, if a part assembly shown generally at 200 with standard mesh materials 202, such as stainless steel, are used to weld a part similarly as shown in FIG. 4, the current will shunt across the part (as indicated generally at arrows 204) and create a non-homogeneous weld.

In an embodiment of the present invention, the welding of non-conductive thermoplastics using the stacked wire mesh for angles greater than 45 degrees using the process outlined in FIG. 4. All three circuits are welded at once by connecting poles at the right side of the part and not using internal connectors.

As is readily appreciated in the drawings, the method allows stacking wire mesh at a common intersection point to achieve any desired bend angle. There is provided a hole in one part at the common intersection point through which a probe passes and presses against the stacked wire mesh and the wallstock of the other part. This ensures that the probe properly contacts the mesh for energizing of the mesh circuit. The probe is used to either contact the mesh at points where it is sandwiched between the layers or in a preferred embodiment holes are provided along the intersection points for allowing insertion of a probe. In a preferred embodiment where a highly conductive part material such as carbon composite is used the present process allows limiting current shunting across a conductive composite part using each strip of wire mesh as a separate weld circuit. As set forth herein this is accomplished using the adjacent common intersection point of the stacked wire mesh as a pole for each circuit. In addition, in a preferred embodiment as the welding process proceeds in welding of a complex part, remaining poles along the circuit are disconnected to limit shunting across the part. According to one embodiment where the composite is conductive and where mesh is a highly conductive mesh, the entire mesh is energized between the outermost peripheral edges for energizing the entire mesh material. In another embodiment, where the composite is non-conductive, an outer peripheral end of each of the mesh conductor materials are contactable by a probe and the outer peripheral edges are energized for welding of the part.

Also, the process of the present invention allows cascade welding of the part such that each welding circuit can be energized separately using unique processing parameters which allow custom welding along each leg of the seam to be welded. Thus, the welding process can be tailored for the morphology unique to the part at each individual leg of the circuit. This provides improved weld results, quality and increased strength of the weld custom tailored to the individual needs of the part design.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of resistive implant welding thermoplastic composites comprising the steps of:
   providing at least two sections of a component to be welded together and formed of a thermoplastic weldable material, said at least two sections of the component each have a welding surface where said at least two sections of the component are welded together, said welding surface including at a first surface adjoining a second surface at an angle exceeding about 30 degrees;
   providing a first wire mesh conductor material positioned between the welding surface of the at least two sections along the first surface;
   providing a second wire mesh conductor material positioned between the welding surface of the at least two sections along the second surface in an overlapping manner; and,
   operably welding the at least two sections of the component together.

2. The method of resistive implant welding thermoplastic composites of claim 1, wherein the thermoplastic composition is conductive and the implant welding is conducted by first contacting and energizing both sides of the first wire mesh conductor and thereafter contacting and energizing both sides of the second conductor.

3. The method of resistive implant welding thermoplastic composites of claim 1, wherein the thermoplastic composition is conductive and said mesh is a highly conductive mesh wherein the entire mesh is energized between the outermost peripheral edges for energizing the entire mesh material.

4. The method of resistive implant welding thermoplastic composites of claim 1, wherein the component has access ports at predetermined locations for contacting of the first wire mesh conductor material and the second wire mesh conductor material with an electrical contact probe for energizing mesh circuits for selective welding of the components.

5. The method of resistive implant welding thermoplastic composites of claim 1, further comprising contacting the first wire mesh conductor material and the second wire mesh conductor material and a wall surface of one of said at least two sections for ensuring contact of the first wire mesh conductor material or the second wire mesh conductor material with a probe.

6. The method of resistive implant welding thermoplastic composites of claim 1, wherein the thermoplastic material is non-conductive and the angle to be welded is greater than 45 degrees, and wherein an outer peripheral end of the first wire mesh conductor material is contactable by a probe and said outer peripheral edges are energized for welding of the part.

7. The method of resistive implant welding thermoplastic composites of claim 1, wherein at least one of the sections is made from a carbon fiber material.

8. The method of resistive implant welding thermoplastic composites of claim 2, wherein at least one of the sections is made from a carbon fiber material.

9. The method of resistive implant welding thermoplastic composites of claim 3, wherein at least one of the sections is made from a carbon fiber material.

10. The method of resistive implant welding thermoplastic composites of claim 4, wherein at least one of the sections is made from a carbon fiber material.

11. The method of resistive implant welding thermoplastic composites of claim 5, wherein at least one of the sections is made from a carbon fiber material.

12. A method of resistive implant welding thermoplastic composites comprising the steps of:
   providing at least two sections of a component to be welded together and formed of a thermoplastic weldable material, the at least two sections of the component each have a welding surface where the at least two sections of the component are welded together, the welding surface including at least a first surface adjoining a second surface at an angle exceeding about 30 degrees;
   providing a first wire mesh conductor material positioned between the welding surface of the at least two sections along the first surface;
   providing a second wire mesh conductor material positioned between the welding surface of the at least two sections along the second surface in an overlapping manner;
   operably energizing the first wire mesh conductor material and second wire mesh conductor materials at the same time or sequentially; and,
   welding the at least two sections of the component together.

13. The method of resistive implant welding thermoplastic composites of claim 12, wherein the thermoplastic composition is conductive and the implant welding is conducted by first contacting and energizing both sides of the first wire mesh conductor and thereafter contacting and energizing both sides of the second conductor wire mesh.

14. The method of resistive implant welding thermoplastic composites of claim 12, wherein the thermoplastic composition is conductive and the first and second wire mesh conductors are a highly conductive mesh wherein the first and second wire mesh conductors are energized between the outermost peripheral edges for energizing the entire mesh material.

15. The method of resistive implant welding thermoplastic composites of claim 12, wherein the component has at least one access hole at predetermined location(s) for contacting of the mesh with at least one electrical contact probe for energizing mesh circuits for selective welding of the components.

16. The method of resistive implant welding thermoplastic composites of claim 15, further comprising contacting the first and second wire mesh conductor materials and a wall surface of one of the two sections for ensuring contact of the first and second wire mesh conductor materials with the electrical contact probe.

17. The method of resistive implant welding thermoplastic composites of claim 12, wherein the thermoplastic material is non-conductive.

18. The method of resistive implant welding thermoplastic composites of claim 17, wherein an outer peripheral end of each of the wire mesh conductor materials are contactable by a probe and outer peripheral edges are energized for welding of the part.

19. The method of resistive implant welding thermoplastic composites of claim 12, wherein at least one of the sections is made from a carbon fiber material.

20. A method of resistive implant welding thermoplastic composites comprising the steps of:
   providing at least two sections of a component to be welded together and formed of a thermoplastic weldable material, the at least two sections of the component each have a welding surface where the at least two sections of the component are welded together, the welding surface including a plurality of surfaces to be welded where adjoining surfaces are at an angle exceeding about 30 degrees;
   providing a plurality of wire mesh conductors, where each of the plurality of wire mesh conductors is positioned in an overlapping manner between the welding surfaces of the at least two sections along the plurality of surfaces;
   operably energizing the plurality of wire mesh conductors; and,
   welding the at least two sections of the component together;
   wherein at least one of the sections is made from a carbon fiber material.

* * * * *